United States Patent
Osugi et al.

(10) Patent No.: US 8,134,456 B2
(45) Date of Patent: Mar. 13, 2012

(54) TURN SIGNAL INDICATOR LAMP APPARATUS FOR A MOTORCYCLE, AND MOTORCYCLE INCLUDING SAME

(75) Inventors: Hiroyuki Osugi, Saitama (JP); Kenji Watanabe, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 489 days.

(21) Appl. No.: 12/322,651

(22) Filed: Feb. 5, 2009

(65) Prior Publication Data
US 2009/0237231 A1    Sep. 24, 2009

(30) Foreign Application Priority Data
Mar. 19, 2008 (JP) ................. 2008-071334

(51) Int. Cl.
*B60Q 1/34* (2006.01)
*B62J 6/00* (2006.01)

(52) U.S. Cl. .................... 340/475; 340/465; 362/476
(58) Field of Classification Search .................. 340/465
See application file for complete search history.

(56) References Cited

U.S. PATENT DOCUMENTS
6,802,632 B2 * 10/2004 Kajitori et al. ............... 362/473
7,220,028 B2 * 5/2007 Nakayama et al. ........... 362/474

FOREIGN PATENT DOCUMENTS
JP    62-46626    12/1987
JP    2003-089381    3/2003

* cited by examiner

*Primary Examiner* — Jennifer Mehmood
*Assistant Examiner* — John Mortell
(74) *Attorney, Agent, or Firm* — Carrier Blackman & Associates, P.C.; William D. Blackman; Joseph P. Carrier

(57) ABSTRACT

A wire is provided in a turn signal power cord drawn out from a turn signal indicator fixed to a front fork while achieving a good appearance. A turn signal indicator includes a lamp case housing a lamp, and a stay member coupled to the lamp case. The stay member includes an annular collar fitted around a circumference of a front fork shaft. A cord-housing groove is formed in an outer part of the annular collar. A turn signal power cord is drawn out from the lamp case to the annular collar through an arm part to the outside through the groove. The cord-housing groove is covered with a cover, which is formed integrally with a locking member that engages with a slot part of a top bridge, as an anti-rotation component of the apparatus.

14 Claims, 6 Drawing Sheets

TURN SIGNAL INDICATOR LAMP APPARATUS FOR A MOTORCYCLE, AND MOTORCYCLE INCLUDING SAME

CROSS-REFERENCE TO RELATED APPLICATIONS

The present invention claims priority under 35 USC 119 based on Japanese patent application No. 2008-071334, filed on 19 Mar. 2008. The entire subject matter of this priority document, including specification, claims and drawings, is incorporated by reference herein.

BACKGROUND OF THE INVENTION

1. Technical Field of the Invention

The present invention relates to a turn signal indicator lamp assembly for a motorcycle, and particularly to a motorcycle turn signal indicator lamp assembly in which a turn signal power cord, connected to a turn signal lamp, can be housed in a stay member, which is a support member for the turn signal lamp.

2. Background Art

There is conventionally known a lighting device, such as a turn signal indicator lamp assembly or a cornering light, for a motorcycle. Such a lighting device is normally attached to steering handlebars or front forks of a vehicle body front end.

Examples of known motorcycle turn signal assemblies are given below.

[Patent Document 1] Japanese Utility Model Application Publication No. Sho 62-46626

[Patent Document 2] Japanese Patent Application Publication No. 2003-89381

For example, Patent Document 1 discloses a cornering light for a motorcycle, in which a lighting device is attached to a member that extends from a ring-shaped member fixed to a front fork.

Patent Document 2 discloses a turn signal indicator lamp assembly for a motorcycle, where the assembly is supported by a pair of holder members via an indicator-supporting base part. In the lamp assembly of Patent Document 2, the holder members are two evenly-divided members making up a ring-shaped holder that fits around an outer circumference of a front fork.

These types of known lighting devices each require a power supply cord (electric cord) for supplying electricity to the lighting device. In the turn signal indicator disclosed in Patent Document 2, one of the paired holder members is provided with a groove capable of housing a turn signal power cord, and the turn signal power cord extended from the turn signal indicator through the turn signal indicator supporting base part is extended through the groove. In this turn signal indicator capable of housing the turn signal power cord in the holder, a portion where the turn signal power cord is exposed to the outside is decreased to achieve a good appearance.

In the turn signal indicator disclosed in Patent Document 2, the holder is divided into the two members to house the turn signal power cord in the holder. This increases the number of components as well as the number of assembling steps. Moreover, the ring-shaped holder that fits the shape of the front fork rotates easily around the front fork. Accordingly, in order to prevent the ring-shaped holder from rotating, an additional member may be needed, or the structure may get more complicated.

Although the known motorcycle turn signal lamp assemblies are useful for their intended purposes, a need still exists in the art for an improved motorcycle turn signal lamp assembly. In particular, there is a need for an improved motorcycle turn signal lamp assembly having its component parts configured and arranged to present a clean and uncluttered appearance.

SUMMARY OF THE INVENTION

An object of the present invention is to provide a turn signal indicator apparatus for a motorcycle, which apparatus is suitable for supporting a turn signal power cord in a holder that is attached to a cylindrical member using a simple anti-rotation structure, without increasing the number of components and/or the number of assembling steps.

To solve the problems described above in the background art, a first aspect of the present invention provides a motorcycle turn signal indicator apparatus that includes a lamp case housing a turn signal lamp, and a stay member coupled to the lamp case to attach the case to a front fork.

In the turn signal indicator according to the first aspect, the stay member is made of a rubbery elastic body, and includes an annular collar that fits around an outer circumference of the front fork and partially has a slot part, and an arm part that extends from the annular collar and is coupled to the lamp case; the turn signal indicator further includes a fastening component used to fasten and fix the annular collar to the front fork by shortening a gap of the slot part formed in the annular collar; a turn signal power cord housing groove is formed in an outer circumference of the annular collar in a circumferential direction, and is used to draw out a turn signal power cord to an outside of the annular collar, the turn signal power cord being connected to the turn signal lamp; and the turn signal indicator further includes a cover that is fastened together with the stay member by the fastening component and covers the turn signal power cord.

A second aspect of the present invention is the turn signal indicator in which the cover is fixed to the annular collar and includes a locking member that extends upward from a fixing part fixed to the annular collar and engages with a top bridge arranged above the front fork.

A third aspect of the present invention is the turn signal indicator that further includes a bolt through-hole through which a bolt being part of the fastening component penetrates, the bolt through-hole being formed in a protrusion part that extends from the slot part of the annular collar. In the turn signal indicator, as a collar for the bolt, a collar is formed integrally with the cover, and is inserted into the bolt through-hole.

According to the first aspect, the stay member is provided with the slot part, and is configured to have a binding force with the front fork by shortening the gap of the slot part. Moreover, the cover is fastened together with the stay member by the fastening component. Accordingly, the number of components can be reduced, and the number of steps can also be reduced because the annular collar and the cover are fastened at the same point. Further, since the cover is used for covering the turn signal power cord housing groove, the turn signal power cord is less exposed to the outside, which can achieve a good appearance.

According to the second aspect, the annular collar of the stay member can be unrotatably attached to the front fork. Moreover, the locking member acting as an anti-rotation member can be formed integrally with the cover.

According to the third aspect, by the single bolt as a fastening component that fastens the slot part, the stay member is fixed to the front fork, and at the same time, the cover is attached to cover the turn signal power cord housing groove.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION OF ILLUSTRATIVE EMBODIMENTS

An embodiment of the present invention will now be described, with reference to the drawings. Throughout this description, relative terms like "upper", "lower", "above", "below", "front", "back", and the like are used in reference to a vantage point of an operator of the vehicle, seated on the driver's seat and facing forward. It should be understood that these terms are used for purposes of illustration, and are not intended to limit the invention.

Figure 2:
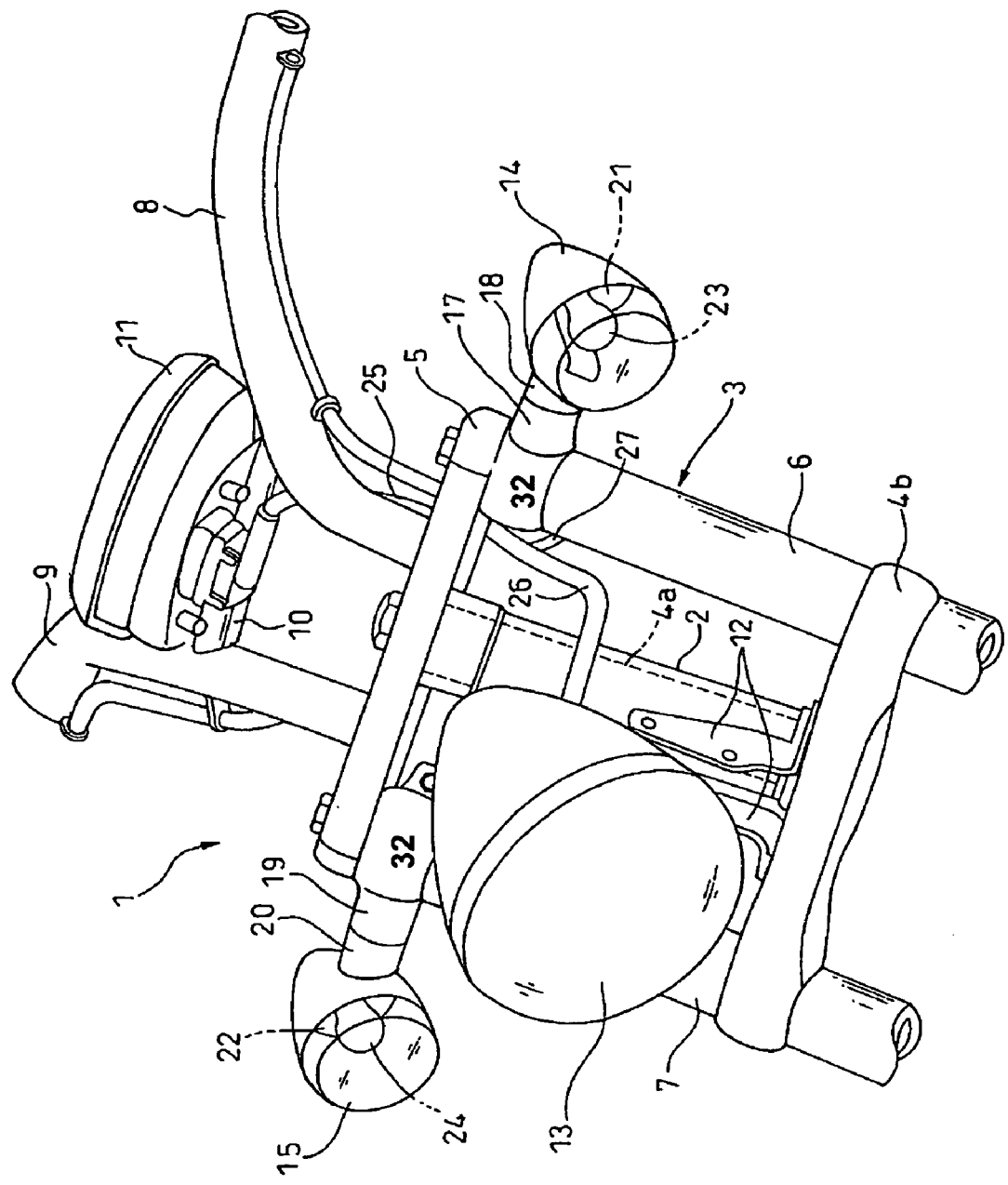
FIG. 2 is a perspective view showing a front structure of a motorcycle provided with the turn signal indicator according to the embodiment of the present invention.

FIG. 2 is a perspective view showing a front structure of a motorcycle 1 provided with a pair of turn signal indicator assemblies 14, 15 according to an illustrative embodiment of the present invention. The motorcycle 1 has a head pipe 2 connected to a front end of a main frame portion (not shown) of a vehicle body frame.

At the front end of the motorcycle 1, a steering assembly 3 is pivotally supported by the head pipe 2. The steering assembly 3 includes a steering stem 4a pivotally supported by the head pipe 2; a lower bridge 4b attached to a lower part of the steering stem 4a; and a top bridge 5 attached to an upper part of the steering stem 4a. The steering assembly 3 also includes left and right front fork shafts 6 and 7 supported by the lower bridge 4b and the top bridge 5; and left and right steering handlebars 8 and 9. Lower parts of the left and right steering handlebars 8, 9 are respectively attached to the top bridge 5, and upper parts of the left and right steering handlebars 8 and 9 extend upwardly in left and right directions, respectively. A front axle (not shown), that rotatably supports a front wheel thereon, is attached to lower parts of the front fork shafts 6 and 7. A cross pipe 10 is arranged between the steering handlebars 8 and 9 in a bridging manner. An instrument cluster 11 is arranged on the cross pipe 10. A set of stay members 12 is attached to the lower bridge 4b, for supporting a headlight 13 thereon.

The left and right turn signal indicator assemblies 14 and 15 are attached to upper parts of the left and right front fork shafts 6 and 7, respectively, and portions of the indicator assemblies 14, 15 are in abutting contact with an underside of the top bridge 5, as shown.

Structure of Turn Signal Indicator Assemblies

The left turn signal indicator assembly 14 includes a support stay member 17 (stay member 17) and a lamp case 18, which is operatively attached to the stay member 17. The stay member 17 includes an annular collar 32 with a hole formed therein, having its inner diameter sized and configured to fit around a cylindrical outer shape of the left front fork 6.

In similar fashion, the right turn signal indicator assembly 15 includes a support stay member 19 (stay member 19) and a lamp case 20 which is operatively attached to the stay member 19. The stay member 19 includes an annular collar 32 with a hole formed therein having its inner diameter sized and configured to fit around to fit around a cylindrical outer shape of the right front fork 7.

The stay members 17 and 19 may be made of a flexibly resilient elastomeric material (a polymeric material such as a thermoplastic olefin elastomer). The turn signal indicator assemblies 14 and 15 include turn signal lamps (bulbs) 23 and 24, respectively. The turn signal lamp bulbs 23 and 24 are supported by holders 21 and 22, respectively.

As seen best in FIG. 2, a harness 25, drawn out from the instrument cluster 11, includes a headlight power cord 26 extended to the headlight 13, and a turn signal power cord 27 extended to the turn signal indicator 14.

Figure 1:
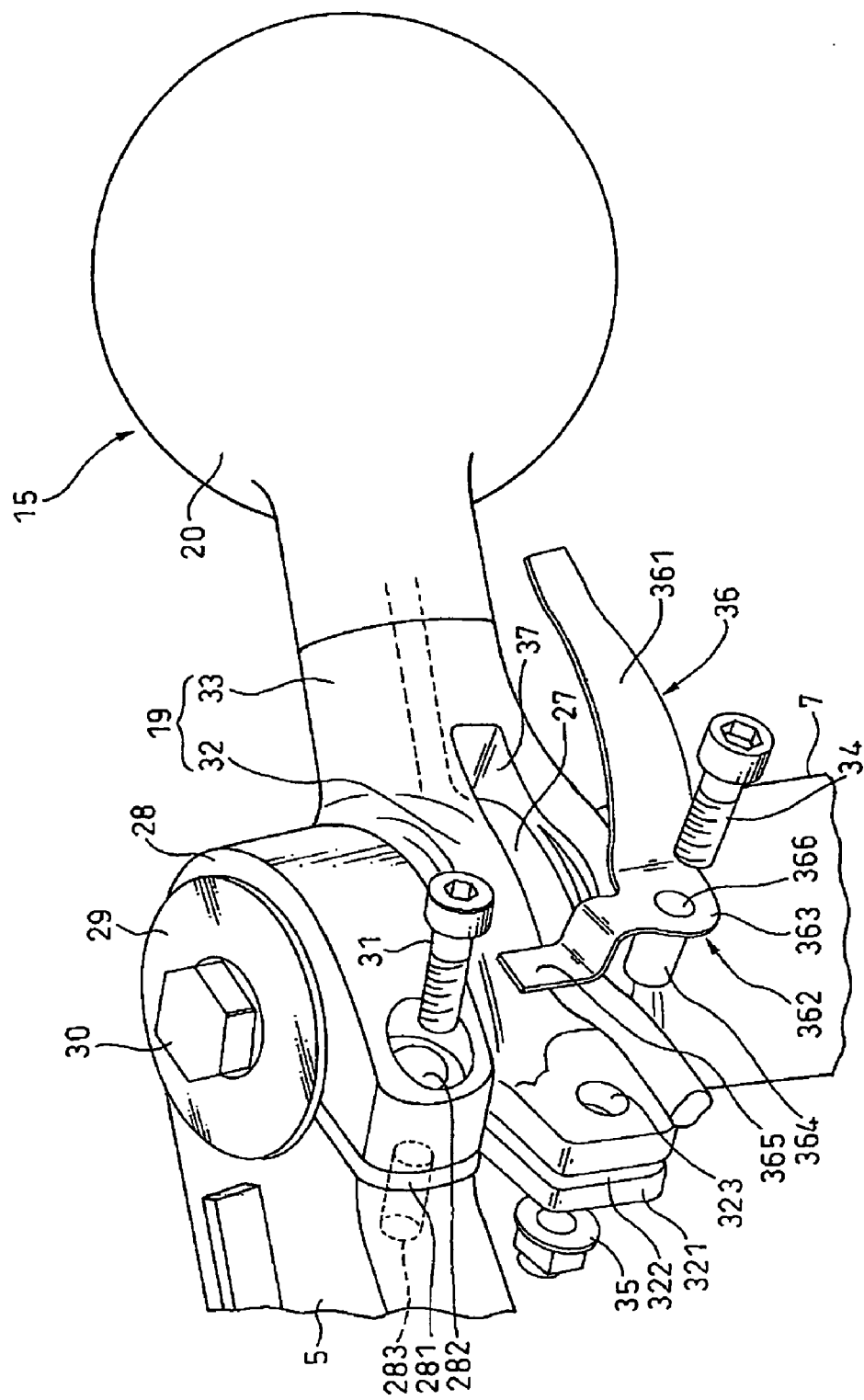
FIG. 1 is a rear perspective, partially-exploded view showing a main part of a turn signal indicator according to an embodiment of the present invention rear perspective, partially-exploded view showing a main part of a turn signal indicator according to an embodiment of the present invention.

Since the turn signal indicator assemblies 14 and 15 have structures symmetric to each other, a description will be given only of the right turn signal indicator assembly 15, provided at the right side of a vehicle body, with the understanding that the left turn signal assembly 14 includes a symmetrical but otherwise identical structure. FIG. 1 is a rear perspective, partially-exploded view showing a main part of the turn signal indicator 15. In FIG. 1, the top bridge 5 has an annular collar 28 which is fitted around the outer-circumference of a small-diameter part (fork top) formed at an upper end of the front fork 7. A bolt 30 is screwed through a washer 29 and into an upper part of the fork top of the front fork 7, which has been fitted into the annular collar 28 from below.

The annular collar 28 of the top bridge 5 has a slot 281 formed therein by cutting into the annular collar 28 in the axial direction of the front fork 7. A smooth-walled bolt through-hole 282 and a threaded screw hole 283 are coaxially formed in the annular collar 28 substantially transverse to, and on opposite sides of the slot 281. The bolt through-hole 282 is formed at the near side (in FIG. 1) of a bifurcated flange 321 adjacent the slot 281, and the threaded screw hole 283 is formed in the top bridge 5 at the far side of the slot 281, on an extension of the bolt through-hole 282. A bolt 31 is screwed into the screw hole 283 to narrow the gap of the slot 281 and thereby, to tighten the annular collar 28 around the front fork shaft 7 and to attach the annular collar thereto.

The stay member 19 of the turn signal indicator 15 includes an annular collar 32 and an arm part 33. The annular collar 32 is fitted around the outer circumference of the front fork 7, and the arm part 33 is integrally formed with the collar 32 and extends outwardly thereon for connecting to the lamp case 20. The annular collar 32 includes a protruding bifurcated flange 321 extending in a radial direction of the annular collar 32. The protruding bifurcated flange 321 is provided with a slot 322 formed therein, similar to the slot 281 provided in the top bridge 5, and bisecting the flange. The slot 322 is formed to have a length reaching an inner part of the annular collar 32.

The protruding flange 321 is provided with a through-hole 323. A bolt 34 is inserted into the through-hole 323, and is then screwed into a nut 35 to narrow the gap of the slot 322. In this way, the annular collar 32 is removably fastened to the front fork 7. The bolt 34 and the nut 35 are fastening components, which narrow the gap of the slot 322 when tightened. It should be noted that a cover member 36, to be mentioned later, can be attached concurrently with the fastening by the bolt 34.

Figure 5:
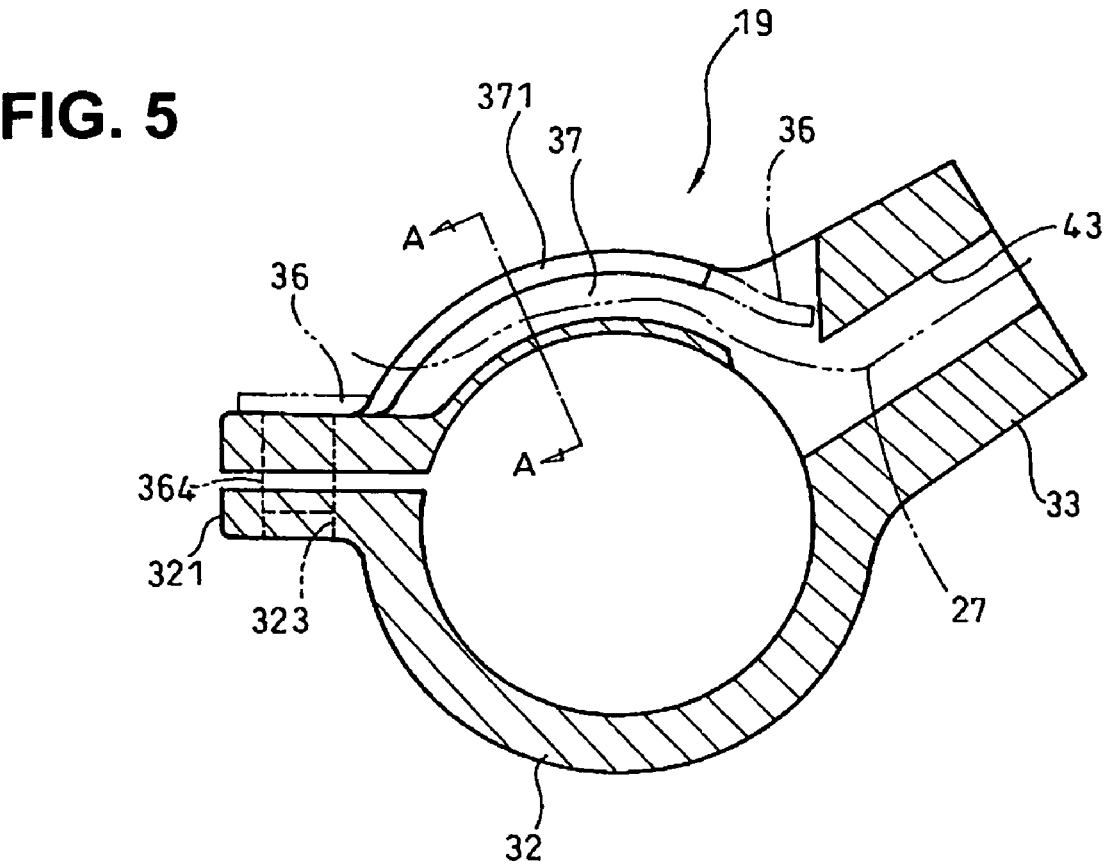
FIG. 5 is a cross-sectional view of a stay member.
Figure 6:
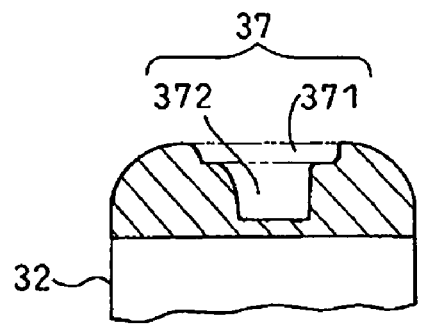
FIG. 6 is a cross-sectional view taken at a position A-A in FIG. 5.
Figure 7:
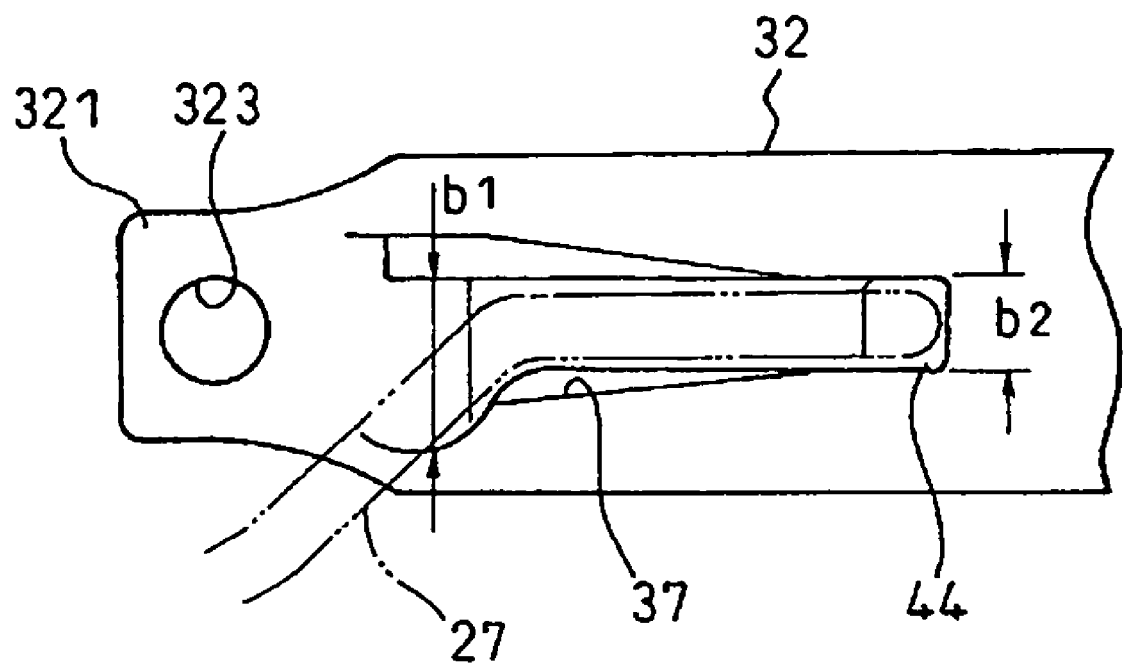
FIG. 7 is a front view showing a main part of the stay member.

As seen best in FIGS. 5-7, a recessed groove 37 is formed in the annular collar 32 in such a manner as to cut into the collar 32 from its outer circumferential side. The groove 37 is formed in an area of the collar 32 extending from a base of the protruding flange 321 to the arm part 33. The groove 37 extends into the arm part 33 and connects with a central bore 43 of the arm part, such that when the arm part 33 is connected to the lamp case 20, the groove 37 communicates with the inside of the lamp case 20 via the central bore 43. Accordingly, the turn signal power cord 27, for supplying electricity to the bulb 24 in the lamp case 20, can be drawn out from the lamp case 20 by feeding the turn signal power cord 27 through the arm part 33 of the stay member 19 and outwardly along the groove 37 formed in the outer circumference of the collar 32.

Since the groove 37 is open on the outer circumference of the annular collar 32, the turn signal power cord 27 is exposed to the outside, which is visually unattractive. For this reason, a cover 36 is provided for attachment to the collar 32 in order to cover the groove 37 housing the turn signal power cord 27. FIG. 1 also shows the cover 36 that covers the groove 37. The cover 36 includes a cover body 361 and a base (fixing part) 362. The cover body 361 has a shape that corresponds to the outer shape of the annular collar 32. The base 362 has a hole 366 formed therein, and when the base 362 is attached to the protruding flange 321 by the bolt 34, the cover 36 is fastened to the stay member 19 in a manner such that the cover body 361 is substantially flush with the outer surface of the annular collar 32.

The base 362 is made up of a core plate 363, a sleeve 364 connected to the core plate, and a locking member 365 formed integrally with the core plate. The core plate 363 extends from the cover body 361, while the sleeve 364 extends in a direction perpendicular to the surface of the core plate 363. The locking member 365 extends upwardly from the core plate 363. The sleeve 364 is a hollow tubular component, which is inserted into the through-hole 323 of the flange 321 formed on the collar 32, to cover the circumference of the bolt 34. The sleeve 364 is bonded to the base 362 of the cover 36 by welding or the like. The locking member 365 has a general L-shape, as shown, which extends upward from the core plate 363 first, then bends in the horizontal direction, and then bends upward again.

The cover 36 is fixed to the protruding flange 321 by the bolt 34 as follows. First, the sleeve 364 is inserted into the through-hole 323 of the flange 321, with the cover body 361 aligned with the recessed groove 37 of the collar 32, and the locking member 365 covering a top corner portion of the flange 321. Then, an upper tab part of the locking member 365 is inserted into the slot 281 of the top bridge 5. In this state, the bolt 34 is inserted into the hole 366 of the base 362 and through the sleeve 364, and is screwed into the nut 35 to fasten the two halves of the protruding flange 321 together. In this way, the gap of the slot 322 is narrowed, and the cover 36 is fixed in place with the cover body 361 covering the groove 37. At the same time, the turn signal indicator 15 can be prevented from being rotated around, and displaced on, the front fork 7.

Figure 3:
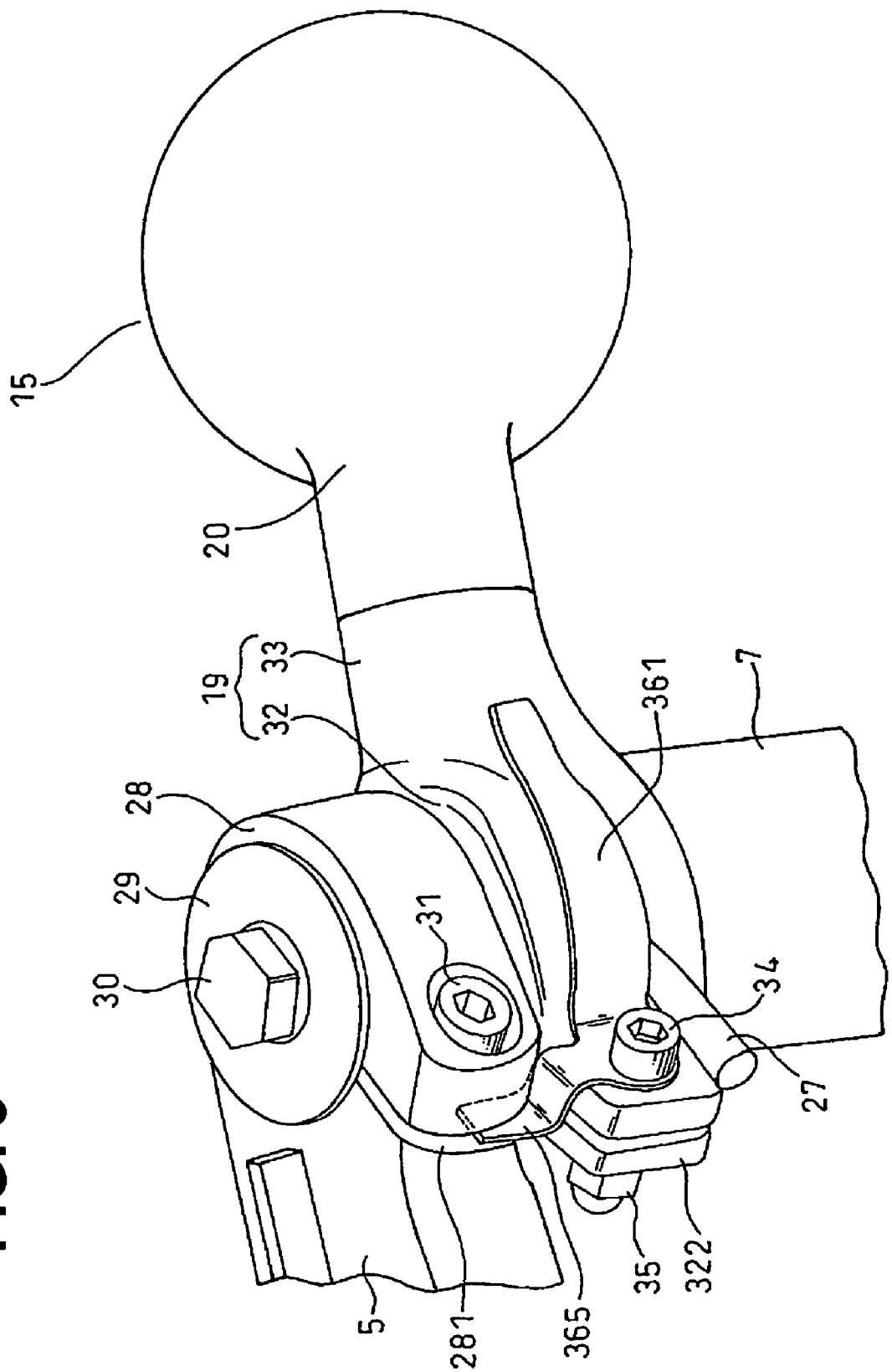
FIG. 3 is a perspective view showing a main part of the turn signal indicator.

FIG. 3 is a perspective view showing a main part of the assembled turn signal indicator assembly 15, to which the cover 36 is attached. As shown in FIG. 3, the turn signal power cord 27 is covered up, and the upwardly-extending tab of the locking member 365 engages with the slot 281 of the top bridge 5.

Figure 4:
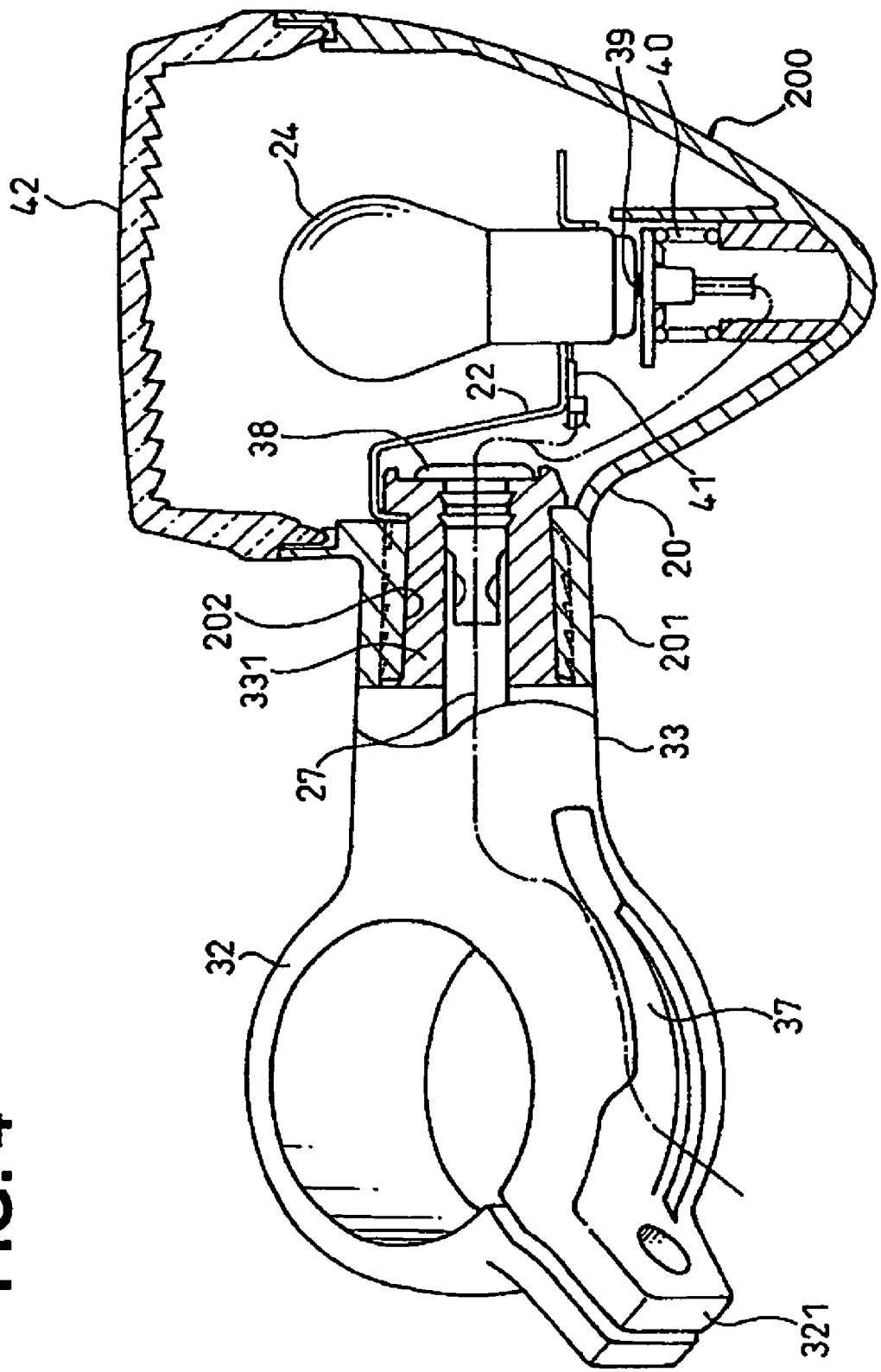
FIG. 4 is a perspective, partially cross-sectional view of the turn signal indicator.

Next, a further description will be given of the structure of the turn signal indicator 15. FIG. 4 is a perspective, partially cross-sectional view of the turn signal indicator 15. The lamp case 20 includes a hollow housing portion 200 and a stem portion 201 integrally formed with the housing portion. A hollow bore 202 is formed in the stem portion 201 of the lamp case 20. A reduced-diameter tip portion 331 of the arm part 33 is inserted and fitted into the hole 202. The tip portion 331 has a tubular shape, and a flexible grommet 38 is inserted into the tip portion 331. The grommet 38 is inserted to fix the position of the turn signal power cord 27 (indicated by a dashed line) in the tip portion 331. The holder 22 for supporting the bulb 24 is fixed to the stem portion 201 by being pinched between the tip portion 331 of the arm part 33 and the stem portion 201. The lamp case 20 is provided with a spring 40, which pushes a power-supply contact 39 to the plus terminal of the bulb 24. Further, a grounding contact 41 is connected to the lamp case 20.

A lens 42, that orients and directs light from the bulb 24, is fitted around a front opening of the lamp case 20. The turn signal power cord 27, into which cords from the power-supply contact 39 and the grounding contact 41 are bound, extends to the annular collar 32 through the grommet 38, and is then drawn out via the groove 37.

FIG. 5 is a cross-sectional view of the stay member 19; FIG. 6 is a cross-sectional view taken at a position A-A in FIG. 5. In FIGS. 5 and 6, the annular collar 32 of the stay member 19 is provided with the recessed groove 37 formed therein. A step is formed in the groove 37 to form a seat region 371 into which the cover 36 is fitted, and a trough region 372 in which the turn signal power cord 27 is housed. The arm part 33 is provided with the central bore 43 (turn signal power cord through-hole), through which the turn signal power cord 27 extends. As shown in FIG. 5, the sleeve 364 of the cover 36 is fitted into the hole 323 of the protruding flange 321 of the annular collar 32. At the same time, the cover body 361 of the cover 36 is fitted in the seat region 371 of the groove 37, to cover the turn signal power cord 27 housed in the trough region 372 of the groove 37.

FIG. 7 is a front view of a main part of the stay member 19, showing a front shape of the turn signal power cord-housing groove 37. In FIG. 7, the groove 37 is narrower at a first width b2 on the arm part 33 side than at a second width b1 on the protruding flange 321 side. An end part on the side having the first width b2 communicates, at a hollow region 44, with the turn signal power cord through-hole 43 of the arm part 33. As indicated by a chain double-dashed line, the turn signal power cord 27 is drawn out to the groove 37 through the hollow region 44, and is then guided to the outside of the cover 36 from below the cover 36 at the side having the second (wide) width b1.

Although the present invention has been described herein with respect to a number of specific illustrative embodiments, the foregoing description is intended to illustrate, rather than to limit the invention. Those skilled in the art will realize that many modifications of the illustrative embodiment could be made which would be operable. All such modifications, which are within the scope of the claims, are intended to be within the scope and spirit of the present invention.

What is claimed is:

1. A turn signal indicator apparatus for a motorcycle, said apparatus comprising:
a hollow lamp case;
a turn signal lamp disposed inside of the case;

a stay member for attaching the case to a cylindrical front fork shaft of the motorcycle, the stay member comprising:

an annular collar that fits around an outer circumference of the front fork shaft and has a slot formed therein, a bifurcated protruding flange integrally formed with the annular collar and extending outwardly thereon, the bifurcated protruding flange comprising a pair of adjacent plates separated by said slot, and having a through-hole formed therein for receiving a shaft of a fastener, and an arm portion that extends from the annular collar and is connected to the case, wherein the annular collar has a cord-housing groove formed in an outer portion thereof to receive a turn signal power cord, a fastener used to fasten and fix the annular collar to the front fork shaft by narrowing the slot formed in the annular collar;

a turn signal power cord partially disposed in the cord-housing groove and electrically connected to the turn signal lamp; and a cover member that is fastened to the stay member by the fastener and that covers the portion of the turn signal power cord disposed in the cord-housing groove, the cover member extending from an area proximate the fastener to the arm portion of the stay member and having a shape corresponding to the outer shape of the annular collar;

wherein the cord-housing groove is formed in an area of the annular collar extending from a base of the bifurcated protruding flange to an area of the arm portion in the back of the stay member;

and wherein the cover member is configured to cover substantially all of the cord-housing groove from the back.

2. A turn signal indicator apparatus for a motorcycle, said apparatus comprising:

a hollow lamp case;

a turn signal lamp disposed inside of the case;

a stay member for attaching the case to a cylindrical front fork shaft of the motorcycle, the stay member comprising:

an annular collar that fits around an outer circumference of the front fork shaft and has a slot formed therein, a bifurcated protruding flange integrally formed with the annular collar and extending outwardly thereon, the bifurcated protruding flange comprising a pair of adjacent plates separated by said slot, and having a through-hole formed therein for receiving a shaft of a fastener, and an arm portion that extends from the annular collar and is connected to the case, wherein the annular collar has a cord-housing groove formed in an outer portion thereof to receive a turn signal power cord, a fastener used to fasten and fix the annular collar to the front fork shaft by narrowing the slot formed in the annular collar;

a turn signal power cord partially disposed in the cord-housing groove and electrically connected to the turn signal lamp; and a cover member that is fastened to the stay member by the fastener and that covers the portion of the turn signal power cord disposed in the cord-housing groove;

wherein the cover is operatively attached to the annular collar, and includes a locking member that extends upwardly thereon and that is adapted to engage with a top bridge of the motorcycle, whereby a rotary position of the apparatus may be fixed in relation to the front fork shaft.

3. The turn signal indicator apparatus according to claim 1, wherein the annular collar has a bifurcated protruding flange thereon with a through-hole formed therein, through which a shaft of the fastener extends, wherein the slot is formed between adjacent plates of the bifurcated protruding flange, and wherein a collar for the fastener is formed integrally with the cover, and said collar is inserted into the through-hole of the bifurcated flange.

4. The turn signal indicator apparatus of claim 1, wherein the stay member is formed from a resilient elastomeric material.

5. The turn signal indicator apparatus of claim 2, wherein the locking member of the cover is in engagement in the top bridge of the motorcycle, whereby the turn signal indicator can be prevented from being rotated around.

6. The turn signal indicator apparatus of claim 1, wherein the cover includes a cover body for covering a portion of the turn signal power cord, wherein the cord-housing groove is formed with a stepped cross-sectional shape including a seat portion for receiving the cover body, and a trough portion for housing the turn signal power cord.

7. The turn signal indicator apparatus of claim 1, wherein the cord-housing groove communicates with a hollow bore formed inside of the arm portion via a connecting hole extending therebetween, and wherein the annular collar is configured and arranged to space the power cord outwardly away from the front fork.

8. The turn signal indicator apparatus of claim 1, wherein the cover comprises a core plate having a hole formed therethrough, a cover body attached to the core plate for covering the cord-housing groove, a tubular sleeve attached to the core plate and communicating with the hole in the core plate, and a locking member integrally formed with the core plate, the locking member configured to engage a top bridge of the motorcycle, whereby a rotary position of the apparatus may be fixed in relation to the front fork shaft.

9. The turn signal indicator apparatus of claim 8, wherein the locking member of the cover comprises an upwardly-extending tab for inserting engagement in a slot formed in a top bridge of the motorcycle.

10. The turn signal indicator apparatus according to claim 1, wherein the turn signal indicator is in abutting contact with an underside of a top bridge of the motorcycle.

11. The turn signal indicator apparatus according to claim 2, wherein the turn signal indicator is in abutting contact with an underside of the top bridge of the motorcycle.

12. The turn signal indicator apparatus according to claim 2, wherein the cover member is fixed to the annular collar after the locking member of the cover is fixed to the slot of the top bridge.

13. The turn signal indicator apparatus of claim 1, wherein the turn signal indicator is in abutting contact with an underside of a top bridge of the motorcycle, and wherein the cover member is fixed to the annular collar after the locking member of the cover is fixed to the slot of the top bridge.

14. The turn signal indicator apparatus of claim 2, wherein the turn signal indicator is in abutting contact with an underside of the top bridge of the motorcycle, and wherein the cover member is fixed to the annular collar after the locking member of the cover is fixed to the slot of the top bridge.

* * * * *